(12) United States Patent
Merz (10) Patent No.: US 8,403,576 B2
(45) Date of Patent: Mar. 26, 2013

(54) KEYBOARD FOR HAND HELD COMPUTING DEVICE

(75) Inventor: Nicholas Merz, San Francisco, CA (US)

(73) Assignee: Google Inc., Mountain View, CA (US)

( * ) Notice: Subject to any disclaimer, the term of this patent is extended or adjusted under 35 U.S.C. 154(b) by 609 days.

(21) Appl. No.: 12/350,004

(22) Filed: Jan. 7, 2009

(65) Prior Publication Data

US 2009/0174994 A1 Jul. 9, 2009

Related U.S. Application Data

(60) Provisional application No. 61/006,345, filed on Jan. 7, 2008.

(51) Int. Cl.
*G06F 3/023* (2006.01)
*H01H 13/70* (2006.01)

(52) U.S. Cl. ........ 400/490; 400/472; 400/473; 200/310; 200/314

(58) Field of Classification Search ............. 361/679.09; 400/490, 472; 200/314, 345
See application file for complete search history.

(56) References Cited

U.S. PATENT DOCUMENTS

| 5,747,756 | A * | 5/1998 | Boedecker | 200/5 A |
| 5,871,088 | A * | 2/1999 | Tanabe | 200/514 |
| 6,271,487 | B1 * | 8/2001 | Domzalski et al. | 200/1 B |
| 6,373,008 | B1 * | 4/2002 | Saito et al. | 200/310 |
| 6,806,815 | B1 * | 10/2004 | Kaikuranta et al. | 341/22 |
| 6,956,561 | B2 * | 10/2005 | Han | 345/170 |
| 6,960,733 | B2 * | 11/2005 | Hanahara et al. | 200/314 |
| 7,019,242 | B2 * | 3/2006 | Kim | 200/514 |
| 7,429,707 | B2 * | 9/2008 | Yanai et al. | 200/1 B |
| 2003/0011971 | A1 * | 1/2003 | Suzuki et al. | 361/680 |
| 2006/0042923 | A1 * | 3/2006 | De Richecour et al. | 200/512 |
| 2006/0289285 | A1 * | 12/2006 | Chikahisa et al. | 200/310 |
| 2008/0006516 | A1 * | 1/2008 | Nishino et al. | 200/345 |

* cited by examiner

*Primary Examiner* — Matthew G Marini
*Assistant Examiner* — Marissa Ferguson Samreth
(74) *Attorney, Agent, or Firm* — Morris & Kamlay LLP (57) ABSTRACT

The keyboard assembly is suitable for use as a keyboard of a hand held computing device. The assembly has a base layer of a printed circuit board and includes a carrier layer having snap domes set out in an array aligned with keys of a keypad layer. An electroluminescent layer generates light in areas aligned with the keys to backlight the keys. An actuator layer having projections is aligned with the keys and snap domes. Pressing a key causes a snap dome to be deformed, closing a switch for the key and providing a snap action press and release feedback for the user.

20 Claims, 14 Drawing Sheets

KEYBOARD FOR HAND HELD COMPUTING DEVICE

This application claims the benefit of U.S. Provisional Patent Application No. 61/006,345, filed Jan. 7, 2008.

FIELD OF THE INVENTION

The invention relates to a keyboard for a hand held computing device providing a full QWERTY keyboard and numeric pad and associated keys with tactile feedback provided for each key.

BACKGROUND OF THE INVENTION

As computing devices become reduced to hand held size, a keyboard for such devices is required that is functional without being bulky. A keyboard assembly providing tactile feedback using metal snap domes in the assembly that snap into contact with a conductive material for closing the switch on the key is known from U.S. Pat. No. 6,271,487. However, the assembly requires several parts that are bulky when combined in a hand held device.

SUMMARY OF THE INVENTION

The embodiments of the present invention provide a keyboard assembly suitable for use with a hand held computing device.

DETAILED DESCRIPTION OF THE PREFERRED EMBODIMENTS

Figure 1:
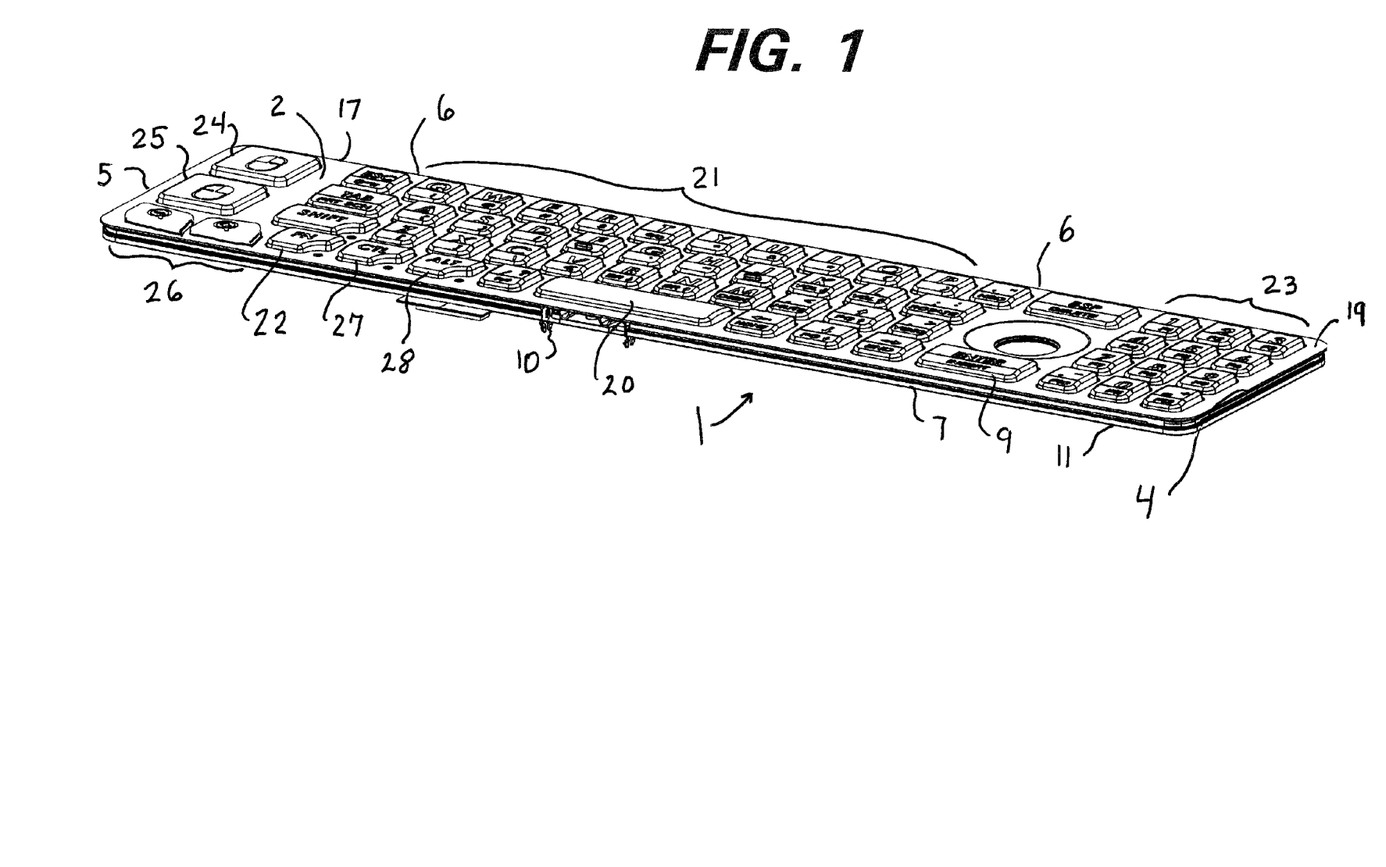
FIG. 1 is a perspective view of the keyboard assembly of the invention.
Figure 2:
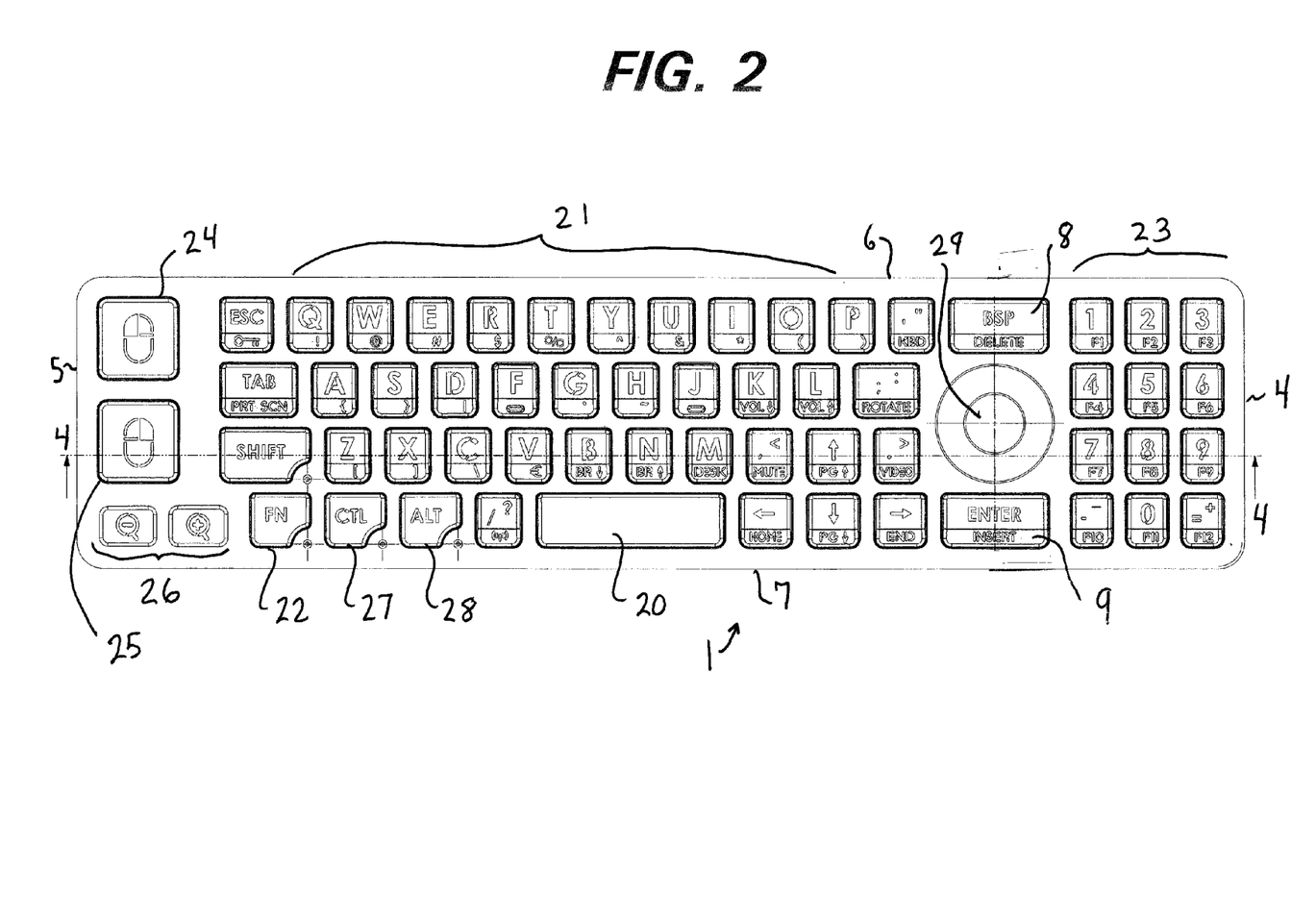
FIG. 2 is a plan view of the keyboard assembly shown in FIG. 1.

FIG. 1 shows an assembled keyboard 1 of the present invention. The keyboard assembly is also shown in plan view in FIG. 2. As shown in FIGS. 1 and 2, the keyboard assembly has the traditional layout or QWERTY layout for the typewriter keys 21. The backspace/delete key 8 and enter/insert key 9 are positioned respectively above and below a track stick opening 29 (the track stick is not shown but is conventional for laptop computers and sized to the keyboard). Rather than have the function keys aligned adjacent the top edge 6 of the keyboard, the function keys are combined with the number keys in an array 23 adjacent the right edge or side 4 of the keyboard 1. On the left side 5 of the keyboard 1 are arranged a "left click" mouse key 24 and a "right click" mouse key 25 as well as zoom keys 26 respectively providing enlargement and reduction of the display.

The array of keys 21 includes a function key FN 22 that enables the secondary function of each key having indicia for a secondary function to be enabled in a known manner. Additionally, a control key CTL 27 and an alternate key ALT 28 are provided on the keyboard. These keys are provided along the bottom edge 7 of the keyboard assembly where space bar 20 is also located.

It is intended that the keyboard assembly be used in a hand held computer or other hand held device in which the keyboard is required to meet a design criteria of being thin. In particular, the keyboard of the present invention is adapted to be used in a hand held computer in which the display screen slides over the keys of the keyboard when in a closed position as in the arrangement shown in U.S. Pat. No. 7,353,053, the disclosure of which is hereby incorporated by reference.

As shown in FIG. 2, preferably the indicia on the top surface of each key represents the input that is provided by the keyboard when the key is pressed. Additionally, the bottom portion of each top surface of a key (if present) indicates a secondary function performed by the key when the key is depressed in combination with the FN key 22. As shown, the indicia are in stencil format, which can be formed by removing sections or portions of a top coating 25 of the keyboard (keypad layer) in the form of the indicia so that the indicia of the keys are backlit by an electroluminescent light source, to be explained in greater detail hereafter.

Figure 3:
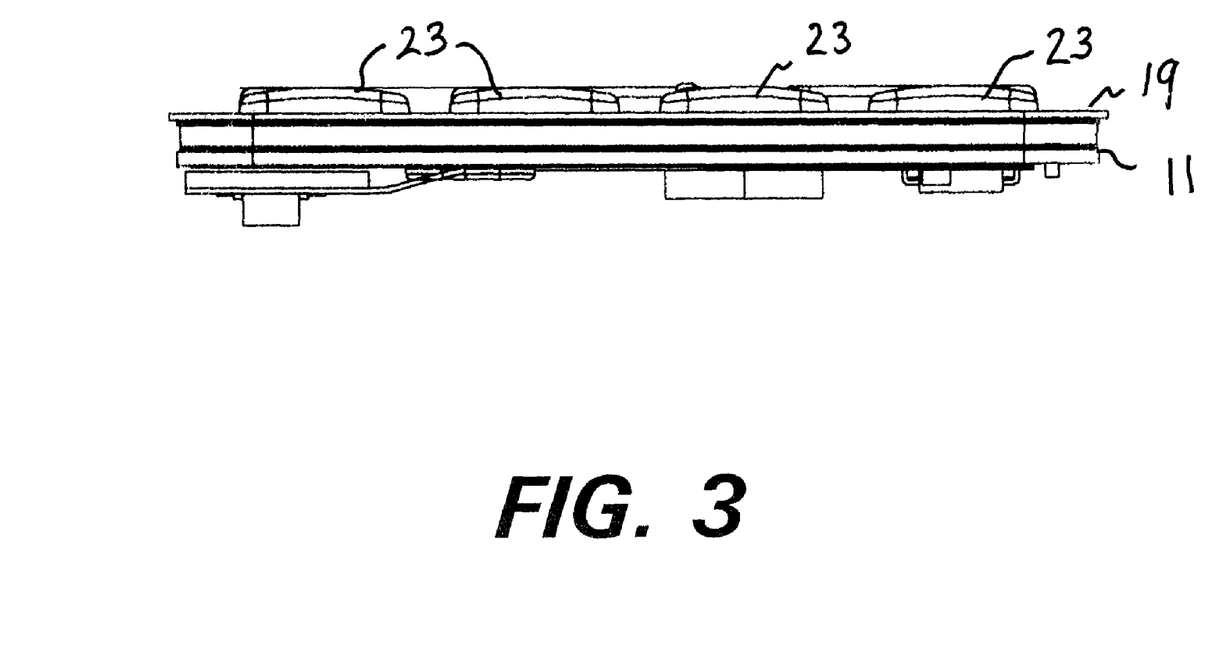
FIG. 3 is an side view of the keyboard assembly of FIG. 1 taken from the right side thereof.
Figure 4:
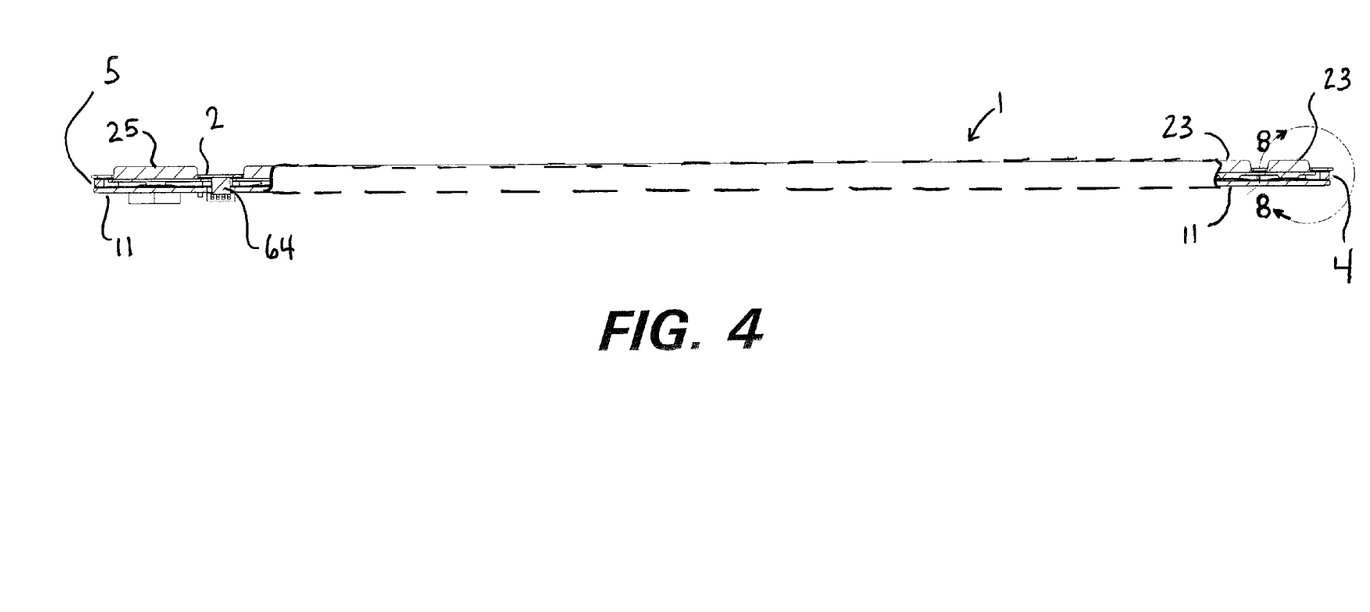
FIG. 4 is a partial cross-section of FIG. 2 taken along line 4-4.
Figure 5:
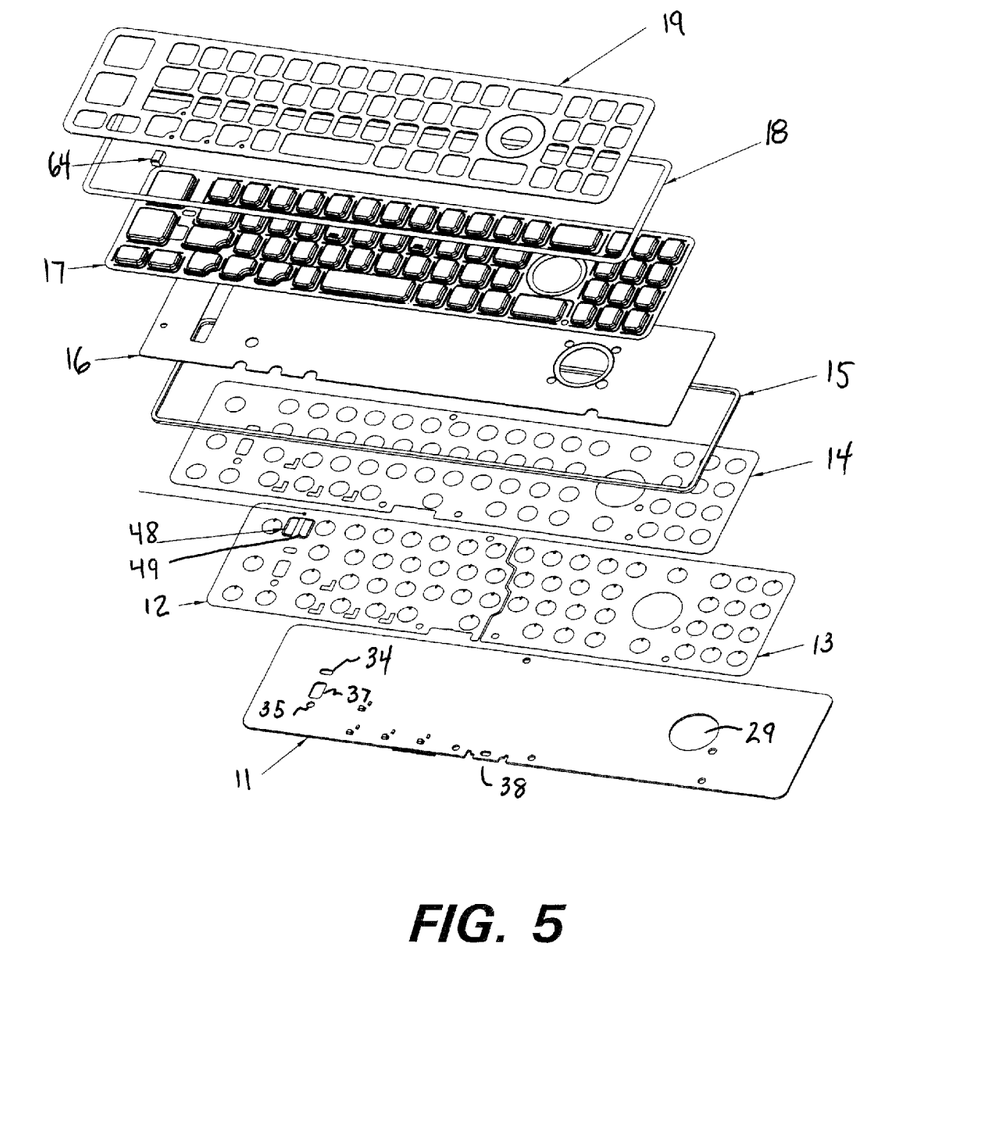
FIG. 5 shows individual layers of the keyboard assembly of the invention in projection view.

FIGS. 3, 4 and 5 show the keyboard assembly in further detail. In particular, the keyboard assembly is comprised of several layers. The bottom or base layer 11 is a printed circuit board shown in greater detail in FIGS. 6 and 7. The layer stacked on top of the PCB 11 is a carrier layer that has snap domes 41 (FIGS. 8-10) set out in an array to be aligned with the keys of the keyboard assembly. In a preferred embodiment, the carrier layer has a left side portion 12 and a right side portion 13.

Stacked on top of the carrier layer and adhered thereto, in a preferred embodiment, is an electroluminescent (EL) layer 14 that generates light in the areas aligned with the keys of the keyboard assembly as indicated by the circular areas 40 in FIG. 5. Electroluminescent layer 14 preferably has several parts including positive and negative electrodes that align through openings 48, 49 in carrier layer 12 and align with electrodes in the PCB 11. Additionally a phosphorescent material lies between the electrodes in a pattern or layout for generating light in a known manner to backlight the keys of the keyboard assembly. In a preferred embodiment, the left and right portions 12 and 13 of the carrier layer and the electroluminescent layer 14 are adhered to one another to form a thin flexible layer of 0.15 to 0.20 mm and preferably less than 0.16 millimeters, which thickness measurement includes the snap domes 41.

The light generated by the electroluminescent layer 14 passes through a translucent layer 16, which is an actuator layer, and is bonded or adhered to the electroluminescent layer. Preferably, an adhesive layer 15 that is of a rectangular frame shape is used, however another adhesive shape or thermal bonding may be used.

A key pad layer 17 is stacked on top of the actuator layer 16. Preferably, the actuator layer 16 is bonded to the individual keys of key pad layer 17 in alignment with the projections at locations 47 (FIG. 8) through an adhesive or thermal bonding technique, etc.

The cover plate 19 which has openings through which the keys of the key pad layer 17 extend, is adhered to the key pad layer 17 through another rectangular shaped adhesive layer 18 or other suitable adhesive. Cover layer 19 is preferably metal and electrically contacted by conductive foam 64 (FIGS. 4 and 5). Conductive foam 64 enables grounding of the metal cover layer 19 to the chassis or housing of the computer device to which the keyboard is installed. A clip 10 is also provided for securing the keyboard in the installation.

Figure 8:
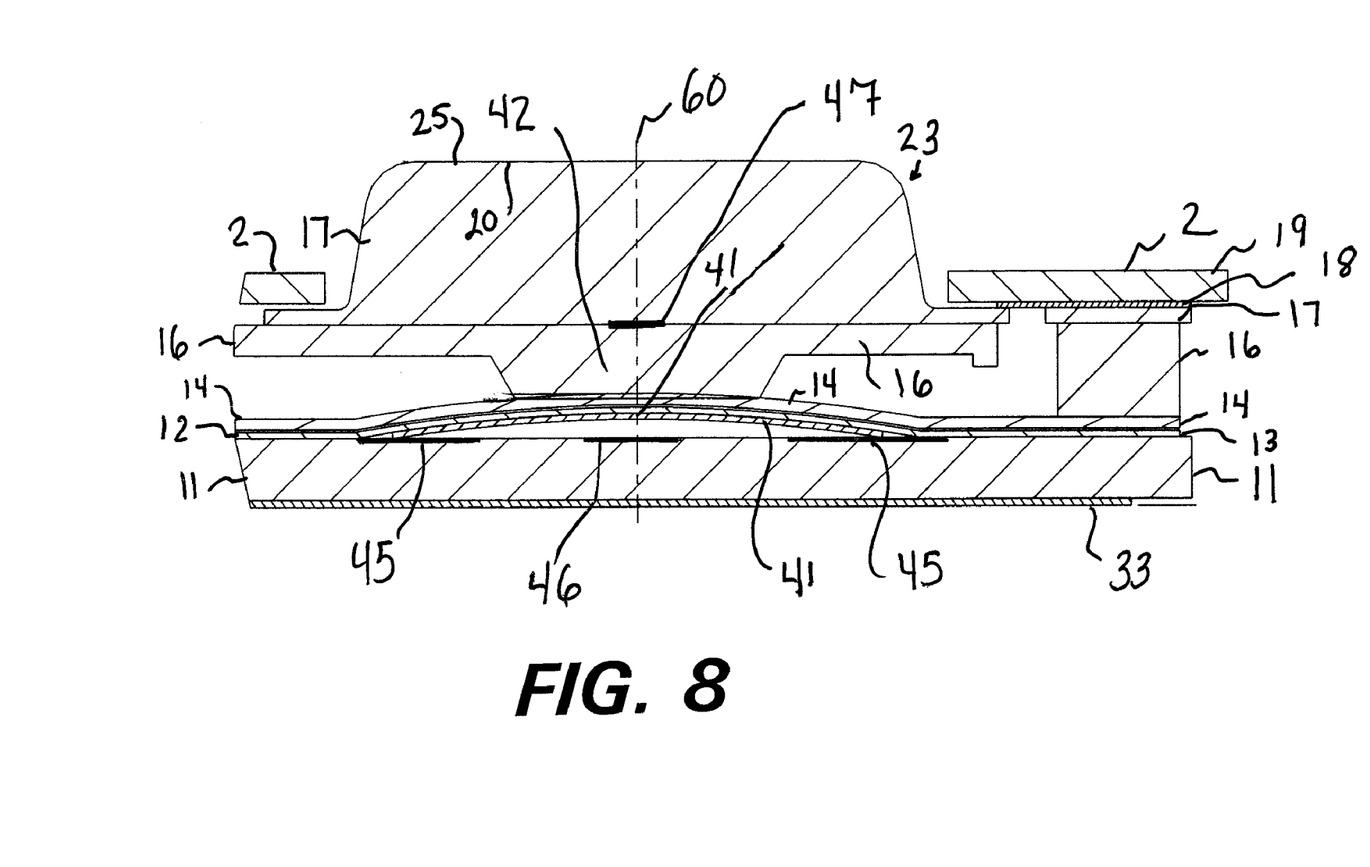
FIG. 8 is a detail view taken along line 8 in FIG. 4.

FIG. 3 shows a right side view of the keyboard and FIG. 4 shows the sectional view taken along line 4-4 of FIG. 2. Additionally, FIG. 8 is a detailed view of one part of the keyboard assembly taken along line 8-8 (detail circle) in FIG. 4. As shown in FIG. 8, the key 23, which is one of the number/function keys has a top face 20 which is coated or painted with a finish coat 25 except in areas where the stencil-shaped key indicia show, as explained with reference to FIG. 2. The key has a center point or axis 60 which is aligned with the top of the snap dome 41 underneath the key. When the key 23 is pressed by a user, the force transmitted through actuator layer 16 (projection 42) makes contact with the electroluminescent sheet 14 and snap dome carrier sheet 13 to exert pressure on the snap dome 41 for deflecting the snap dome into contact with a center circular contact 46 formed on the printed circuit board 11. At the edges of the snap dome 41 is an outer circular contact 45 and as a result of deforming the snap dome into contact with the inner circular contact 46, the switch is closed for the key thereby enabling an output signal from the keyboard to a controller through flex connector 31 (FIG. 6) for indicating that the key has been depressed by the user. Further, the vertical movement of the snap dome into contact with the inner circular contact 46 includes a snap motion in the downward direction toward the printed circuit board and also a biased snap back motion toward the key pad layer 17 to provide tactile feedback for the key to the user when the key is pressed. Use of a lower metal dome for electrical contact with contacts in the base of a switch is known from U.S. Pat. No. 6,271,487, which is hereby incorporated by reference.

Figure 6:
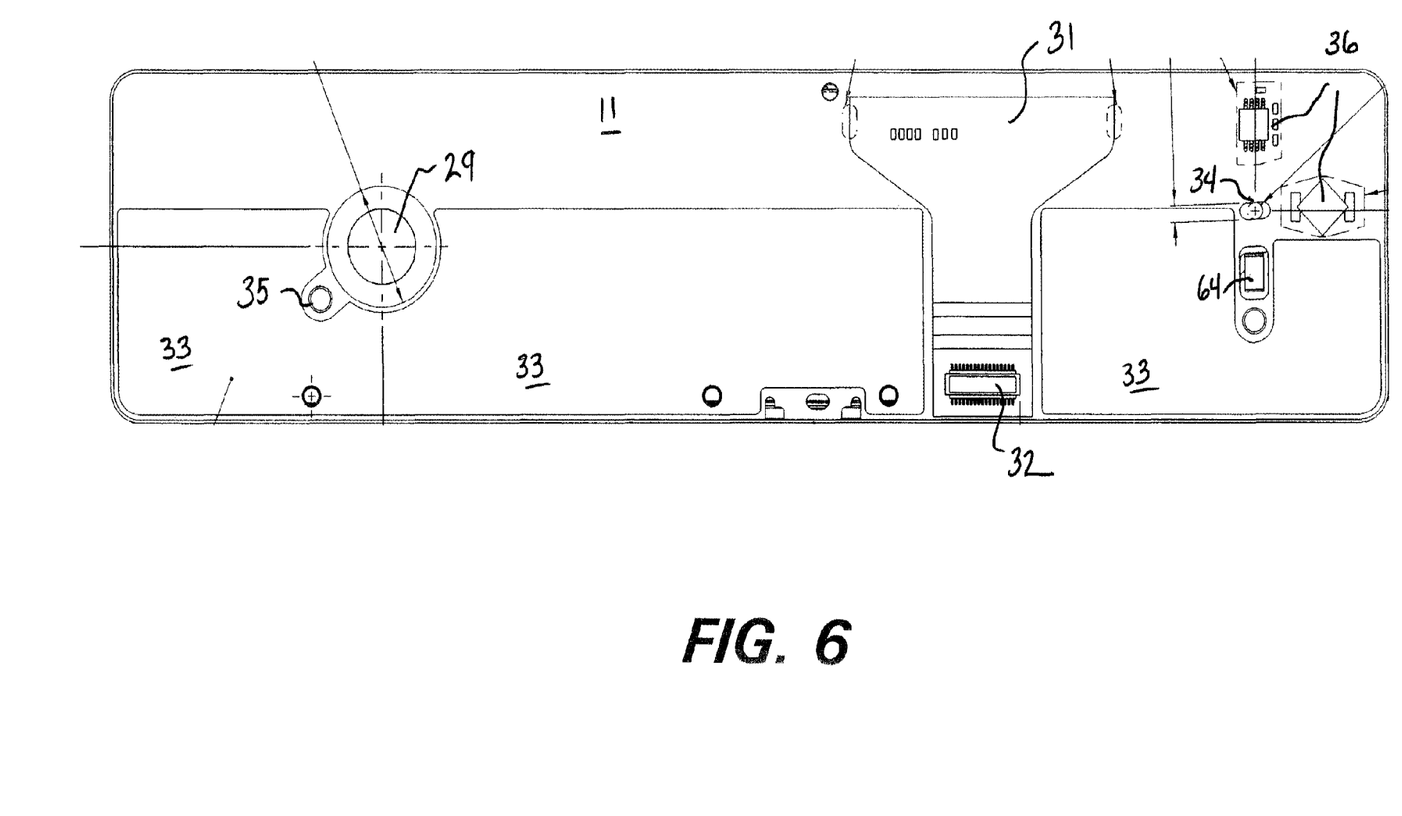
FIG. 6 is a bottom plan view of the keyboard assembly shown in FIG. 1 of the invention.

FIG. 6 is a bottom view of the printed circuit board 11 having adhesive portions 33 that provide for enhancing contact between the printed circuit board 11 and the housing or chassis of the computer when installed. Additionally, a flex connector 31 is provided that is connected to the keys of the keyboard assembly and a connection socket 32 at the end of the flexible connector 31 is intended to connect with the I/O controller of the computer to which the keyboard is connected. Also shown are the opening 29 for the track stick and a through hole 35 which can accommodate a connector such as a plastic rivet for connecting all of the layers of the keyboard assembly. Additional plastic rivets can be used in various places throughout the keyboard assembly to connect part or all of the layers together.

FIG. 6 also shows an alignment hole 34 which can be used in the assembly process to ensure alignment of the layers of the keyboard assembly, which is important for maintaining alignment of the keys of keypad layer 17 with the projections 42 of the actuator layer 16 and the snap dome as well as the contacts 45 and 46. PCB 11 also includes power/controller devices 36 which are known for the purpose of ensuring operation of the keyboard and for providing power to the electroluminescent layer 14 through the electrodes 48 and 49.

Figure 7:
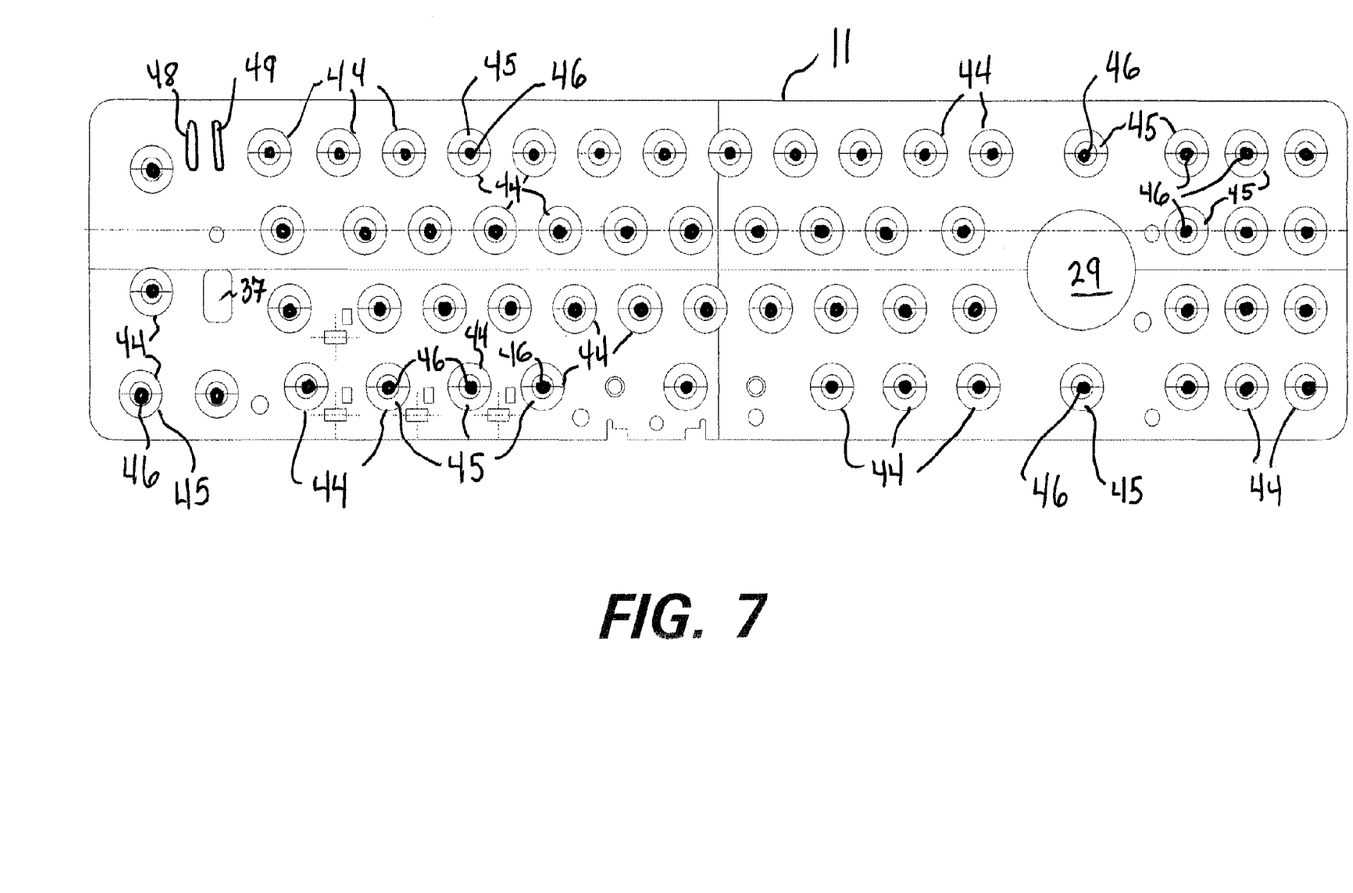
FIG. 7 a plan view of the printed circuit board shown in FIG. 5.

As shown in FIG. 7, the front face of the printed circuit board has electrode contacts for the electroluminescent layer 14 EL−, EL+ 48 and 49, respectively. Additionally, the surface of the PCB 11 has numerous contacts 44, each provided for a key that directly work in conjunction with the snap domes as shown in FIG. 8. In particular, there is a center contact 46 of circular shape and an outer circular contact 45. The snap dome 41 is shown in FIG. 8 and its uncompressed state in which the outer periphery of the snap dome is in contact with the outer circular contacts 45.

Figures 9, 10:
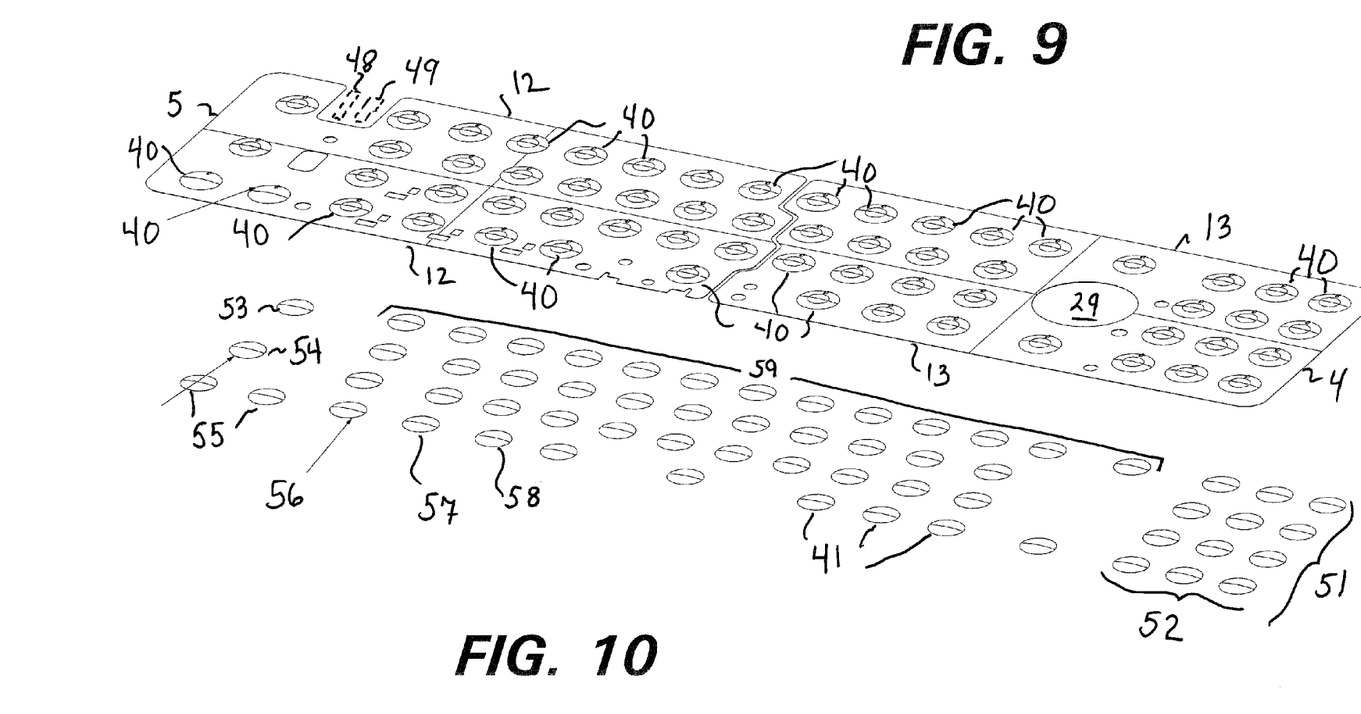
FIG. 9 is a perspective view of the snap dome carrier layer showing the alignment of the snap domes.
FIG. 10 is a view showing an array of snap domes before being adhered to one of the layers shown in the projection view of FIG. 5.

FIG. 9 is a perspective view of the carrier layers 12 and 13 to which the snap domes 41 are adhered. In particular, FIG. 9 shows the areas 40 which are directly above the snap domes 41 that adhere to the underside of the layers 12 and 13 and open downwardly. In a preferred embodiment, the dome of each snap dome is adhered by a spray adhesive, for example, to the under side of each of the carrier layers 12 and 13. Accordingly, the actuator layer 16 which has the center axis 60 as shown in FIG. 8 is aligned with the center or origin of each of the circles 40 shown in FIG. 9 in order to ensure the deflection of the snap domes down onto the printed circuit board contacts 45 and 46.

The snap domes are shown in FIG. 10 and are arranged in a array 51 that includes snap domes 52 for each of the number/function keys and snap domes 53 and 54 for the left and right click mouse keys. Additionally, the snap domes 55 are provided for the display zoom keys and the snap domes 56, 57 and 58 are respectively provided for the function key FN, the control key CTL and the alternate key ALT. In general, the array of snap domes 59 is aligned with the array of keys shown in FIG. 2.

Figure 11:
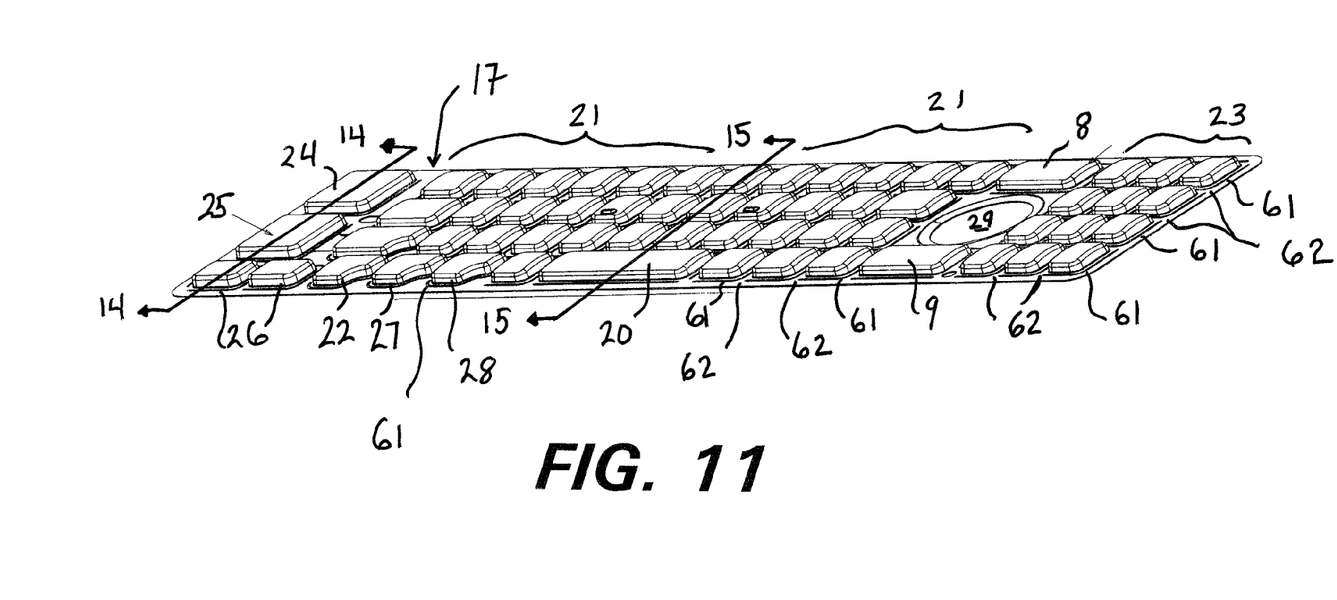
FIG. 11 is a perspective view showing the layout of keys of the keypad layer of the keyboard assembly of the invention.

As shown in FIG. 11, which is a perspective view of the key pad layer 17, there are cut-out lines or curves 61 extending about part of the periphery of each key while leaving the part of the key pad layer between the keys at the corners of the keys intact (62). Preferably, for each of the keys in the key pad layer 17, there is a cut-out portion 61 along at least one of the corners of the key which leaves the other three corners intact. This enables the keys of the keypad layer 17 to move vertically more easily than if the keys were part of the same layer without the cut-out lines 61.

Figure 12:
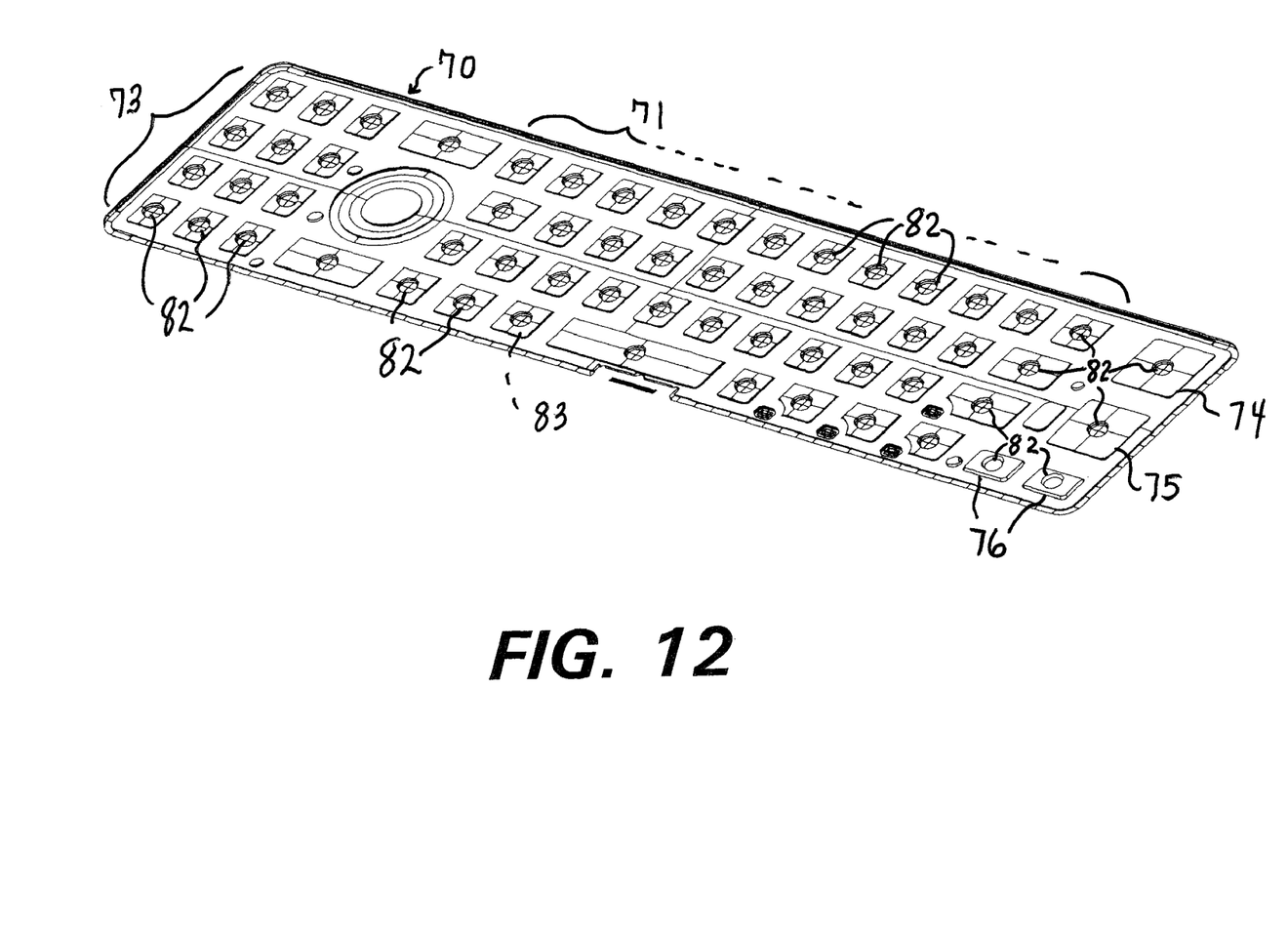
FIG. 12 is bottom view in perspective of a second embodiment of the keypad layer.

The invention is not limited to providing the keypad layer 17 separately from the actuator layer 16, however. As shown in FIG. 12, the projections 42 that are provided for the actuator layer 16 can be formed along the bottom portion of each of the keys of a keypad layer 70 according to a modified embodiment of the invention. For modified keypad layer 70, the keys have alpha keys 71 and number/function keys 73. Further, the left click and right click mouse key 74 and 75 are provided in addition to the display zoom keys 76, the same as for key pad layer 17. The function key, control key and alternate keys are also provided (77, 78 and 79). In the keypad layer 70, projections 82 are provided for each of the keys rather than being provided separately as with the first embodiment of the invention on actuator sheet 16.

Figure 13:
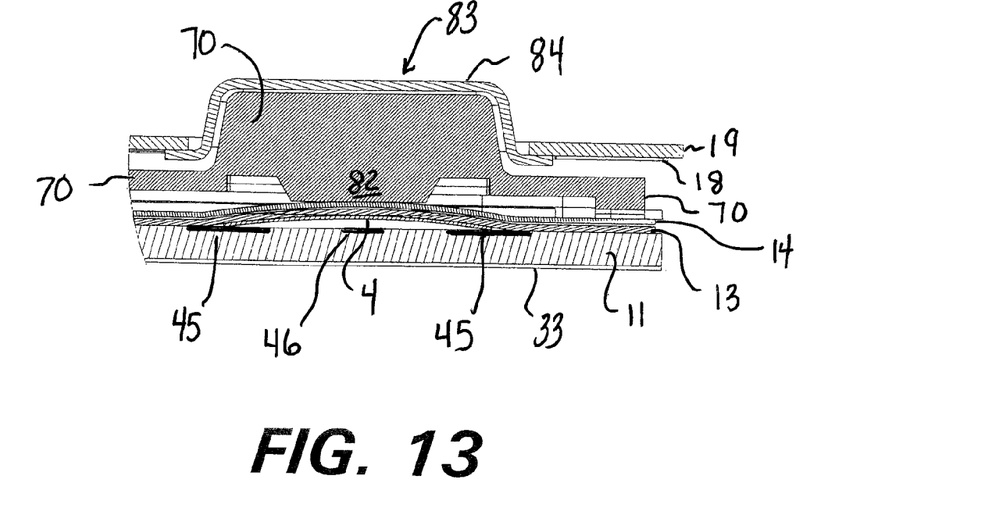
FIG. 13 is a cross-sectional view of a key of a second embodiment of the keypad of FIG. 12.

FIG. 13 shows a cross-sectional view of a typical key of the modified keypad layer 70 in which the projection 82 is integrally molded with the key 85. A layer 84 having the key indicia formed in stencil format is additionally provided for each key 83. The remainder of the assembly of the keyboard according to this modified embodiment is the same as the first embodiment, and therefore like reference numbers have been used to identify parts which are the same as those provided in the first embodiment.

Figure 14:
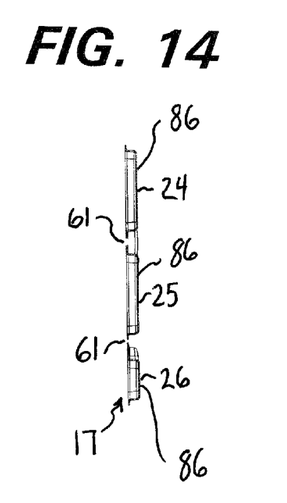
FIG. 14 is a cross-sectional view of the mouse keys and zoom keys taken along line 14-14 in FIG. 11.

FIG. 14 shows a cross-sectional view of the keypad layer 17 according to the first embodiment of the invention. Preferably, the top face 86 of the mouse keys 24, 25 and zoom keys 26 are flat. Further, FIG. 14 shows the cut-out portion 61 between the keys.

Figure 15:
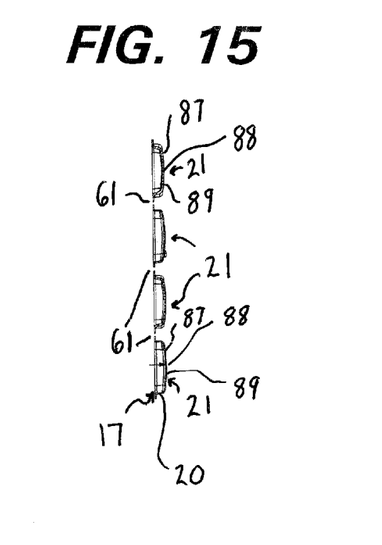
FIG. 15 is a cross-sectional view taken along line 15-15 of FIG. 11.

FIG. 15 is a cross-sectional view taken along line 15-15 of FIG. 11 and shows the preferred embodiment of the keys 21 with the cut-out portion 61 therebetween. In particular, each key 21 has a contour in which the key is curved toward the top edge 6, as shown at 87, crests at the top face 88 and curves toward the bottom edge 7 of the keyboard as shown at 89.

Figure 16:
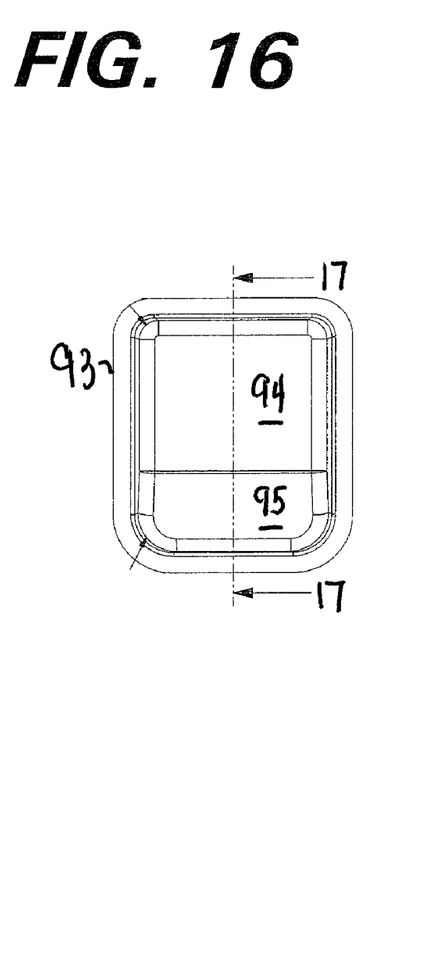
FIG. 16 is a view of an alternative embodiment of a key of the keyboard of the present invention.
Figure 17:
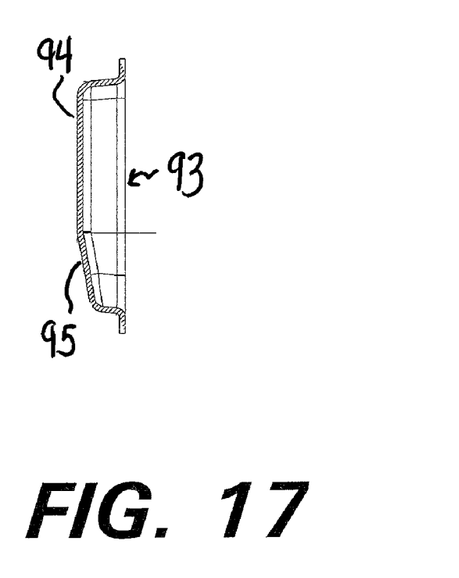
FIG. 17 is a cross-sectional view taken along line 17-17 of FIG. 16.

Although FIGS. 14 and 15 show the preferred embodiments of the contour of the keys, FIGS. 16 and 17 show an alternative embodiment. In particular, FIG. 16 shows a key which can be one of keys 21 or 23 and having a flat upper surface 94 and a slanted surface 95 that slopes toward the bottom edge 7 of the keyboard. FIG. 17 is a cross-sectional view of the key 93 shown in FIG. 16, further showing the flat surface 94 and slanted surface 95.

In a preferred embodiment of the invention, the thickness of the keypad is about 3.0 mm, and preferably about 2.8 mm. The PCB 11 has a thickness of 0.5 mm. The keypad layer 17 has a thickness of 0.43 mm and the thickness of the metal cover 19 is about 0.25 mm. The thickness of the actuator layer is about 0.65 to 0.76 mm including the projections. Also, the actuator layer and keypad layer are preferably made of silicon since it is translucent for passing the EL light therethrough to the top surface of the keys for backlighting.

While preferred embodiments have been set forth with specific details, further embodiments, modifications and variations are contemplated according to the broader aspects of the present invention, all as determined by the spirit and scope of the following claims.

What is claimed is:

1. A keyboard assembly for a hand held computing device including keys, comprising:
   a base layer of a printed circuit board;
   a carrier layer having a plurality of snap domes set out in an array aligned with the keys of the keyboard assembly;
   an electroluminescent layer, disposed immediately adjacent to and conforming to a shape of each of the plurality of snap domes of the carrier layer, that generates light in areas aligned with the keys of the keyboard assembly to backlight the keys of the keyboard assembly;
   an actuator layer having projections aligned with the keys of the keyboard assembly;
   a key pad layer stacked on top of the actuator layer and having individual key portions corresponding to the keys of the keyboard assembly and aligned with the projections of the actuator layer and snap domes, wherein the individual key portions have cut-out portions extending about a periphery of each key with an exception that a part of the key pad layer at a corner of the key portion between the keys is intact; and
   a cover plate having openings through which the key portions of the key pad layer extend;
   wherein the carrier layer and the electroluminescent layer have a combined thickness of less than about 0.20 mm when disposed within the keyboard assembly.

2. The keyboard assembly according to claim 1, wherein the cover plate is adhered to the key pad layer through a rectangular shaped adhesive layer.

3. The keyboard assembly according to claim 1, wherein the actuator layer is adhered to the electroluminescent layer through a rectangular shaped adhesive layer.

4. The keyboard assembly according to claim 1, further including an electrically conductive part, wherein the cover plate is a metal cover layer and is electrically contacted by the electrically conductive part to enable grounding of the metal cover layer to a housing in which the keyboard assembly is installed.

5. The keyboard assembly according to claim 1, wherein a top face of the keys are coated with a finish coat except in areas of the key which provide indicia that are in stencil format.

6. The keyboard assembly according to claim 1, wherein the printed circuit board of the base layer includes an array of switches aligned with the snap domes, including outer and inner concentric contacts such that for each combination of snap dome and switch, edges of the snap dome engage the outer circular contact of the switch in a non-deformed position of the snap dome and an inner portion of the snap dome contacts the inner concentric contact of the switch to close the switch when the snap dome is deformed as a result of receiving a pressing force that is passed through a projection of the actuator layer on the snap dome when a key is pressed by a user.

7. The keyboard assembly according to claim 6, wherein after pressing the inner portion of the snap dome into contact with the inner concentric contact, the snap dome generates a snap motion in an opposite direction of the pressing force resulting in a deformation of the snap dome to return the snap dome into the non-deformed position to provide tactile feedback for the key to the user when the key is pressed.

8. The keyboard assembly according to claim 1, further including a flex connector connected to the printed circuit board for connecting the keyboard assembly to an I/O controller of a hand held computer.

9. The keyboard assembly according to claim 1, wherein the printed circuit board further has power/controller devices for operation of the keyboard assembly and for providing power to the electroluminescent layer.

10. The keyboard assembly according to claim 1, wherein the actuator layer is translucent for passing the light generated by the electroluminescent layer to the keypad layer.

11. The keyboard assembly according to claim 1, wherein the actuator layer and keypad layer are made of silicon and are translucent for passing the light from the electroluminescent layer to the top surface of the keys for backlighting the keys.

12. The keyboard assembly according to claim 1, wherein the carrier layer and the electroluminescent layer have a combined thickness in a range of about 0.15-0.20 mm when disposed within the keyboard assembly.

13. A keyboard assembly for a hand held computing device including keys, comprising:
    a base layer of a printed circuit board;
    a carrier layer having a plurality of snap domes set out in an array aligned with the keys of the keyboard assembly;
    an electroluminescent layer, disposed immediately adjacent to and conforming to a shape of each of the plurality of snap domes of the carrier layer, that generates light in circular areas aligned with the keys of the keyboard assembly to backlight the keys of the keyboard assembly;
    an actuator layer having projections aligned with the keys of the keyboard assembly;

a key pad layer stacked on top of the actuator layer and having individual key portions corresponding to the keys of the keyboard assembly and aligned with the projections of the actuator layer and snap domes, wherein the individual key portions have cut-out portions extending only along one corner of the individual key portions while three other corners remain intact; and a cover plate having openings through which the key portions of the key pad layer extend;

wherein the carrier layer and the electroluminescent layer have a combined thickness of less than about 0.20 mm when disposed within the keyboard assembly.

14. The keyboard assembly according to claim 13, wherein the carrier layer and the electroluminescent layer have a combined thickness in a range of about 0.15-0.20 mm when disposed within the keyboard assembly.

15. The keyboard assembly according to claim 13, further including a flex connector connected to the printed circuit board for connecting the keyboard assembly to an I/O controller of a hand held computer.

16. The keyboard assembly according to claim 13, wherein the printed circuit board further has power/controller devices for operation of the keyboard assembly and for providing power to the electroluminescent layer.

17. The keyboard assembly according to claim 13, further including an electrically conductive part, wherein the cover plate is a metal cover layer and is electrically contacted by the electrically conductive part to enable grounding of the metal cover layer to a housing in which the keyboard assembly is installed.

18. The keyboard assembly according to claim 13, wherein a top face of the keys are coated with a finish coat except in areas of the key which provide indicia that are in stencil format.

19. The keyboard assembly according to claim 13, wherein the printed circuit board of the base layer includes an array of switches aligned with the snap domes, including outer and inner concentric contacts such that for each combination of snap dome and switch, edges of the snap dome engage the outer circular contact of the switch in a non-deformed position of the snap dome and an inner portion of the snap dome contacts the inner concentric contact of the switch to close the switch when the snap dome is deformed as a result of receiving a pressing force that is passed through a projection of the actuator layer on the snap dome when a key is pressed by a user.

20. The keyboard assembly according to claim 19, wherein after pressing the inner portion of the snap dome into contact with the inner concentric contact, the snap dome generates a snap motion in an opposite direction of the pressing force resulting in a deformation of the snap dome to return the snap dome into the non-deformed position to provide tactile feedback for the key to the user when the key is pressed.

* * * * *